United States Patent
Anderson

(10) Patent No.: US 8,125,445 B1
(45) Date of Patent: Feb. 28, 2012

(54) HORIZONTAL CAPACITIVELY SENSED POINTING DEVICE

(75) Inventor: Erik Anderson, Lynnwood, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 997 days.

(21) Appl. No.: 12/011,403

(22) Filed: Jan. 25, 2008

Related U.S. Application Data

(60) Provisional application No. 60/897,627, filed on Jan. 26, 2007.

(51) Int. Cl.
*G09G 5/08* (2006.01)

(52) U.S. Cl. ............... 345/157; 178/18.06; 345/167; 345/184

(58) Field of Classification Search ............. 345/156, 345/157, 160, 161, 167, 184; 178/18.06, 178/19.03; 324/658, 686
See application file for complete search history.

(56) References Cited

U.S. PATENT DOCUMENTS

| | | | | |
|---|---|---|---|---|
| 5,489,922 A * | 2/1996 | Zloof | ............. | 345/156 |
| 5,696,535 A * | 12/1997 | Rutledge et al. | ............. | 345/156 |
| 5,945,980 A * | 8/1999 | Moissev et al. | ............. | 345/173 |
| 6,204,838 B1 * | 3/2001 | Wang et al. | ............. | 345/161 |
| 6,400,354 B1 * | 6/2002 | Pin-Chien | ............. | 345/161 |
| 6,642,857 B1 * | 11/2003 | Schediwy et al. | ............. | 341/20 |
| 6,831,629 B2 * | 12/2004 | Nishino et al. | ............. | 345/157 |
| 6,922,063 B2 * | 7/2005 | Heger | ............. | 324/658 |
| 7,084,854 B1 * | 8/2006 | Moore et al. | ............. | 345/157 |
| 7,602,376 B1 * | 10/2009 | Hetherington | ............. | 345/161 |
| 2004/0017355 A1* | 1/2004 | Shim | ............. | 345/157 |
| 2006/0238205 A1* | 10/2006 | Francis | ............. | 324/658 |
| 2006/0267933 A1* | 11/2006 | Tai et al. | ............. | 345/157 |

\* cited by examiner

*Primary Examiner* — Lun-Yi Lao
*Assistant Examiner* — Tom Sheng

(57) ABSTRACT

Systems and methods for horizontal capacitively sensed pointing devices. Embodiments in accordance with the present invention capacitively sense planar movement with structures that are substantially perpendicular to the plane of movement. In accordance with a first embodiment of the present invention, a sensing mechanism for a pointing device operable to accept movement in a plane includes structures of the mechanism that are substantially perpendicular to the plane. The structures may include a parallel plate capacitor.

18 Claims, 2 Drawing Sheets

HORIZONTAL CAPACITIVELY SENSED POINTING DEVICE

RELATED CASE

This application claims benefit to U.S. Provisional Application 60/897,627, filed Jan. 26, 2007, entitled "HORIZONTAL CAPACITIVELY SENSED POINTING DEVICE" to Anderson, which is hereby incorporated herein by reference in its entirety.

FIELD OF INVENTION

Embodiments of the present invention relate to the field of computer pointing devices. More specifically, embodiments of the present invention pertain to a horizontal capacitively sensed pointing device.

BACKGROUND

A common type of computer pointing device is known as, or referred to as, a pointing stick, also known as an isometric joystick. A pointing stick may generally be thought of as a small joystick, although the application and implementation of joysticks and pointing sticks are generally different. For example, a pointing stick generally has little or no range of movement. Pointing sticks are frequently used in place of, or as an adjunct to, other pointing devices, e.g., computer mice, where space is critical. For example, it is known to place pointing sticks within a laptop computer keyboard, e.g., between the "G," "H" and "B" keys.

It is known to measure a force and direction applied to a pointing stick and convert that information into a cursor movement direction and/or speed. A common method of measuring such a force is to measure the resistance of a strained material coupled to the pointing stick. Unfortunately, such force-based pointing sticks are subject to "cursor drift," a ubiquitous problem among pointing sticks, requiring frequent recalibration. In addition, such force measurements generally require more power than desired, especially for battery based systems, including laptop computers and/or wireless mice.

SUMMARY OF THE INVENTION

Therefore, a need exists for systems and methods of horizontal capacitively sensed pointing devices. A need also exists for systems and methods for horizontal capacitively sensed pointing devices that offer decreased reaction to vertical movements. A further need exists for systems and methods for horizontal capacitively sensed pointing devices that are compatible and complementary with existing systems and methods of pointing device design and manufacturing. Embodiments in accordance with the present invention provide for these needs and advantages.

Embodiments in accordance with the present invention capacitively sense planar movement with structures that are substantially perpendicular to the plane of movement.

Accordingly, systems and methods for horizontal capacitively sensed pointing devices are disclosed. In accordance with a first embodiment of the present invention, a sensing mechanism for a pointing device operable to accept movement in a plane includes structures of the mechanism that are substantially perpendicular to the plane. The structures may include a parallel plate capacitor.

In accordance with an alternative embodiment of the present invention, a capacitive position sensing mechanism includes an annular puck of non conducting material with a puck conductive material on its edge. The puck has a puck radius. In one embodiment, the position sensing mechanism includes a circular ring having a radius of at least the puck radius, and the circular ring surrounds the puck. The circular ring includes at least two ring conductive areas substantially in the plane of the puck and the ring conductive areas are substantially in a plane of the puck conductive material. The ring conductive areas are electrically isolated from one another.

Embodiments of the present invention provide a touch sensor with increased insensitivity to vertical force and a natural feel for acceleration. The embodiments provide for sensitivity in the horizontal direction and therefore can accommodate a wide range of users that touch from light to heavy.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Horizontal Capacitively Sensed Pointing Device

Figure 1:
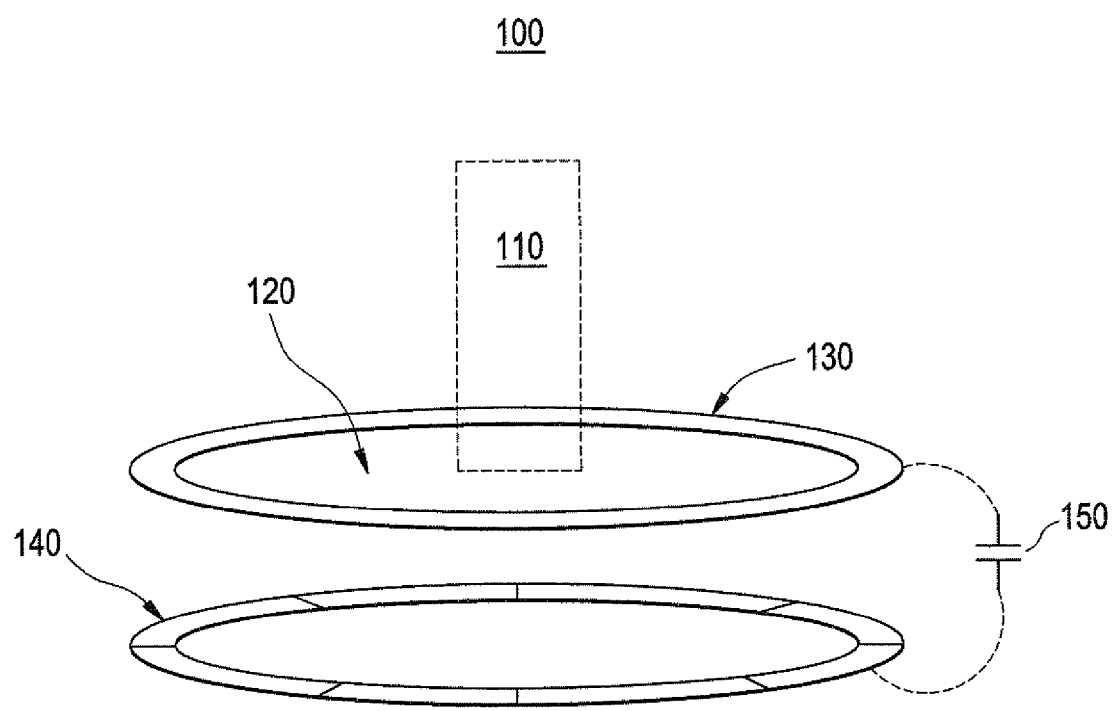
FIG. 1 illustrates a portion of a vertical capacitive sensing mechanism for a pointing stick.

An attractive alternative to force measurements for pointing sticks is capacitive position sensing. FIG. 1 illustrates a portion of a vertical capacitive sensing mechanism 100 for a pointing stick useful in obtaining user input, for instance for a computer system or other electronic device. A pointing stick 110 is coupled to disc 120. Pointing stick 110 is generally pivotally mounted to a cover or housing material (not shown), e.g., a mounting plate for a keyboard or the top surface of a device. The user interfaces mechanically with the stick 110 for displacement thereof to register input.

Disc 120 includes metal ring 130. Metal ring 130 may be on the top or bottom surface of disc 120, or it may be attached to the edge of disc 120. The interior of disc 120 may be non conductive. It is appreciated that disc 120 does not require extensive thickness, as its functional elements are substantially in a plane.

Disc 120 is disposed over a multi-segmented capacitive sense pad 140. Capacitive sense pad 140 may comprise multiple, e.g., eight, surface traces on a printed circuit board (PCB). The surface traces of capacitive sense pad 140 are not connected to one another. Generally, in a rest or default position, metal ring 130 is vertically aligned with capacitive sense pad 140, although metal ring 130 and capacitive sense pad 140 are not required to have the same diameter or width.

Disc 120, including metal ring 130, is capable of movement in a horizontal plane, parallel to that of capacitive sense pad 140, responsive to movements of pointing stick 110. There may be material, e.g., a dielectric foam, interposed between disc 120 and capacitive sense pad 140, to support disc 120. It is appreciated that, outside of pointing stick 110 itself, the sensing elements of sensing mechanism 100 are substantially parallel to the plane of movement.

In operation, a capacitance 150 is sensed between a segment of capacitive sense pad 140 and metal ring 130. As metal ring 130 moves relative to capacitive sense pad 140, e.g., due to user operation, the capacitance of each segment of capacitive sense pad 140 relative to metal ring 130 will also change. By making a capacitive measurement of all segments of capacitive sense pad 140, the position of ring 130 may be determined.

The capacitive system of metal ring 130 and the segments of capacitive sense pad 140 may approximate a parallel plate capacitor. The capacitance of a parallel plate capacitor is given by Relation 1, below:

$$C \alpha A/d \qquad \text{(Relation 1)}$$

wherein C is capacitance, A is area and d is separation or distance between the plates.

In a normal mode of operation, capacitive sensing mechanism 100 functions primarily to change the area (A) component of Relation 1. For example, as metal ring 130 moves toward a particular segment of capacitive sense pad 140, the area of that segment interacting with metal ring 130 increases, increasing the capacitance of that segment. Similarly, the area of other segments, e.g., segments that metal ring 130 is moving away from, interacting with metal ring 130 decreases, decreasing the capacitance of those segments.

Unfortunately, disc 120 may not always maintain a desired separation from capacitive sense pad 140. For example, a downward component of applied force may move disc 120 closer to capacitive sense pad 140 than desired. In such a case, the separation (d) component of Relation 1 is changed, producing an undesirable change in capacitance of mechanism 100.

For example, a force applied to pointing stick 110 directly along its long axis, e.g., "down," should not result in a cursor movement, as the user is not indicating an X-Y direction. However, due to the concurrent decrease in separation between disc 120 closer and capacitive sense pad 140, measured capacitance will vary, which may be reflected in undesired cursor movement.

In addition, it is to be appreciated that the separation component (d) (Relation 1) of capacitance is inversely proportional to capacitance, whereas the area component (A) is proportional to capacitance. Thus, a change in separation accompanying a change in area has the deleterious effect of counteracting the desired change in capacitance due to a change in area.

Figure 2:
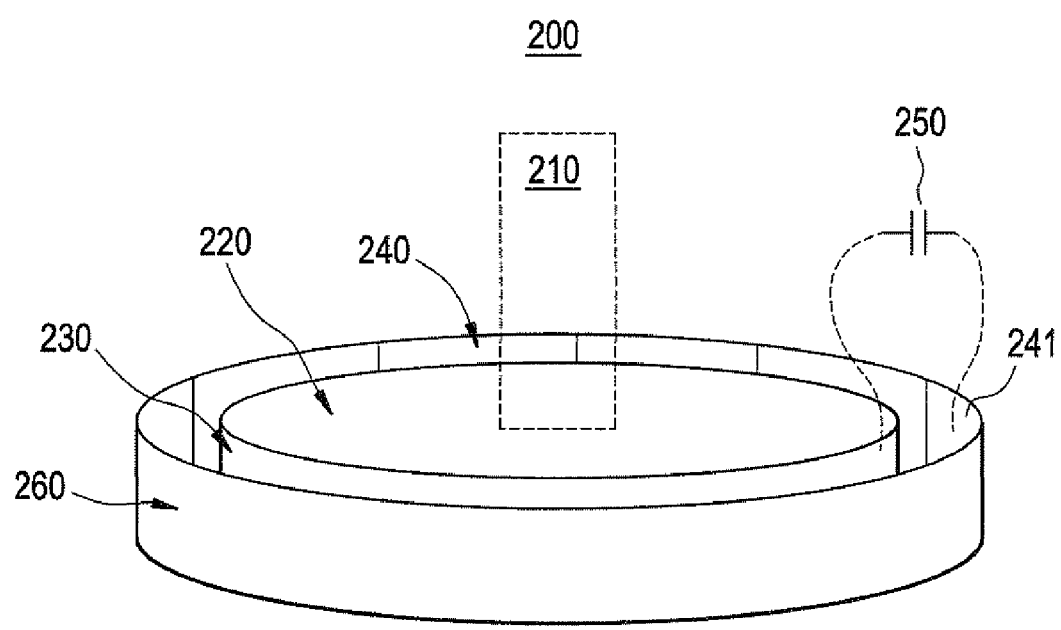
FIG. 2 illustrates a portion of a horizontal capacitive sensing mechanism for a pointing stick, in accordance with embodiments of the present invention.

FIG. 2 illustrates a portion of a horizontal capacitive sensing mechanism 200 for a pointing stick, in accordance with embodiments of the present invention. A pointing stick 210 is coupled to puck 220. Pointing stick 210 is generally pivotally mounted to a cover material (not shown), e.g., a mounting plate for a keyboard or the top surface of a device.

In contrast to disc 120 (FIG. 1), puck 220 comprises a substantial thickness. Puck 220 includes metal ring 230. Metal ring 230 is disposed on the edge of puck 220. The interior of puck 220 may be non conductive.

Puck 220 is surrounded by an annular ring structure 260. Ring structure 260 may be mounded to a printed circuit board. Ring structure 260 comprises a plurality of metallic segments, e.g., segments 240 and 241. The plurality of metallic segments may be applied to ring structure 260, or they may form ring structure 260. The metallic segments may be on the inner surface of ring structure 260, e.g., the surface facing puck 220, the outer surface of ring structure 260, or within ring structure 260.

Puck 220 is capable of movement in a horizontal plane within ring structure 260, corresponding to movement of pointing stick 210. Ring structure 260 may provide mechanical restraint to puck 220, although that is not required. In accordance with embodiments of the present invention, the capacitive sense structures, e.g., puck 220 with metal ring 230, and the segments of ring structure 260, are substantially perpendicular to the plane of movement. For example, as puck 220 moves in a horizontal plane, the sensing structures are vertical.

As described previously with respect to FIG. 1, a capacitance 250 exists between metal ring 230 of puck 220 and each metallic segment of ring structure 260, e.g., segment 241. The design of the system should ensure that metal ring 230 of puck 220 does not come into direct contact with a metallic segment of ring structure 260.

In accordance with one embodiment of the present invention, the metallic segments of ring structure 260 are not formed on the inside face of ring structure 260. Rather, the metallic segments are formed on the outside or interior of ring structure 260. In this novel manner, a portion of ring structure 260 may interpose between metal ring 230 of puck 220 and the metallic segments, preventing direct contact.

In operation, a capacitance 250 is sensed between a segment of ring structure 260, e.g., segment 241, and metal ring 230. As puck 220, and attached metal ring 230, move within ring structure 260, the capacitance of each segment of ring structure 260 relative to metal ring 230 will also change. By making a capacitive measurement of segments of ring structure 260, the position of puck 220 may be determined. It is appreciated that embodiments in accordance with the present invention do not require that the capacitance of all segments be measured. For example, after a few measurements, e.g., less than the total number of segments, the position of puck 220 may be determined with sufficient precision.

It is appreciated that the primary change in capacitance of system 200 results from a change in separation, e.g., the "d" component of Relation 1, between segments of ring structure 260 and metal ring 230 of puck 220. It is further appreciated that the area (A) component of the capacitance of system 200 is not substantially changed due to movement of puck 220.

Advantageously, the system 200 mechanically resists downward force, resulting in little vertical movement. If some vertical movement does occur, it results in very little change in capacitance, as the capacitively coupled structures have much greater horizontal extent, in comparison to the possible vertical movement.

It is generally desirable to have an "acceleration" component to cursor movement controlled by a pointing stick. For example, a "hard" or "fast" press of the pointing stick may move the cursor faster than a "soft" or "slow" press. As system 200 changes capacitance due to changes in separation between the "plates," movement of puck 220 produces a capacitive change with a 1/d relation to that movement. As acceleration has a derivative relationship to speed of movement, which has a derivative relationship to separation, the 1/d relationship of system 200 is more aligned with this desired behavior than the linear relation of the conventional art. As a beneficial consequence, a user's experience of moving pointing stick 210 more naturally corresponds with the desired and observed cursor movements.

Embodiments in accordance with the present invention provide for systems and methods of horizontal capacitively sensed pointing devices. Embodiments in accordance with the present invention provide also provide for a horizontal capacitively sensed pointing devices that offer decreased reaction to vertical movements. Further, embodiments in accordance with the present invention provide for horizontal capacitively sensed pointing devices that are compatible and complementary with existing systems and methods of pointing device design and manufacturing.

Various embodiments of the invention are thus described. While the present invention has been described in particular embodiments, it should be appreciated that the invention should not be construed as limited by such embodiments, but rather construed according to the below claims.

What is claimed is:

1. A capacitive sensing mechanism for a pointing device, comprising:
   an inner moveable ring operable to accept movement parallel to a plane; and
   an outer fixed ring substantially surrounding the inner moveable ring, wherein at least a portion of a surface for each of the inner moveable ring and the outer fixed ring is substantially perpendicular to said plane, and wherein a change in separation between said inner moveable ring and said outer fixed ring produces a change in capacitance of said sensing mechanism which forms a sensing signal for controlling the movement of the pointer.

2. The sensing mechanism of claim 1 wherein said inner moveable ring and outer fixed ring compose a parallel plate capacitor.

3. The sensing mechanism of claim 1 wherein said inner moveable ring resists movement perpendicular to said plane.

4. The sensing mechanism of claim 1 wherein said outer fixed ring comprises a plurality of metal segments electrically isolated from one another.

5. The sensing mechanism of claim 4 wherein said outer fixed ring comprises a non-conductive portion and wherein said metal segments are physically isolated from said inner moveable ring by the non-conductive portion of said outer fixed ring.

6. A capacitive sensing mechanism for a pointing device comprising:
   an annular puck of non conducting material comprising a puck conductive material on its edge, wherein said puck has a puck radius; and
   a circular ring having a radius of at least said puck radius, said circular ring surrounding said puck, wherein said circular ring comprises at least two ring conductive areas substantially in the plane of said puck and wherein said ring conductive areas are substantially in a plane of said puck conductive material, wherein further said ring conductive areas are electrically isolated from one another, and wherein a change in separation between said puck conductive material and said circular ring conductive material produces a change in capacitance of said capacitive sensing mechanism which forms a sensing signal for controlling the movement of the pointer.

7. The capacitive sensing mechanism of claim 6 wherein said puck is substantially cylindrical in shape.

8. The capacitive sensing mechanism of claim 6 wherein said puck conductive material is substantially the height of said puck.

9. The capacitive sensing mechanism of claim 8 wherein said ring conductive areas are substantially the height of said puck.

10. The capacitive sensing mechanism of claim 6 wherein said puck conductive material is electrically continuous.

11. The capacitive sensing mechanism of claim 6 wherein a sensed position of said position sensing mechanism is substantially insensitive to vertical force applied to said position sensing mechanism.

12. A capacitive sensing mechanism for a pointing device comprising:
   an annular puck of non conducting material comprising a puck conductive material on its edge, wherein said puck has a puck radius; and
   a circular ring having a radius of at least said puck radius, said circular ring surrounding said puck, wherein said circular ring comprises at least two ring conductive areas substantially in the plane of said puck and wherein said ring conductive areas are substantially in a plane of said puck conductive material, and wherein further said ring conductive areas are electrically isolated from one another, and wherein a change in separation between said puck conductive material and said circular ring produces a change in capacitance of said capacitive sensing mechanism which forms a sensing signal for controlling the movement of the pointer.

13. The capacitive sensing mechanism of claim 12 further comprising a pointing stick coupled to said annular puck, wherein movement of said pointing stick produces said change in separation between said puck conductive material and said circular ring.

14. The capacitive sensing mechanism of claim 12 wherein said circular ring provides mechanical restraint to said annular puck.

15. The capacitive sensing mechanism of claim 12 wherein said at least two ring conductive areas comprise at least eight ring conductive areas.

16. The capacitive sensing mechanism of claim 12 forming a parallel plate capacitor wherein said puck conductive material forms a first plate of said parallel plate capacitor and one of said at least two ring conductive areas forms a second plate of said parallel plate capacitor.

17. The capacitive sensing mechanism of claim 16 wherein movement of said puck results in a very small change in plate area of said capacitive sensing mechanism.

18. The capacitive sensing mechanism of claim 12 wherein a sensed position of said position sensing mechanism is substantially insensitive to vertical force applied to said position sensing mechanism.

* * * * *